US011815703B2

(12) United States Patent
Han et al.

(10) Patent No.: US 11,815,703 B2
(45) Date of Patent: Nov. 14, 2023

(54) META-LENS AND OPTICAL APPARATUS INCLUDING THE SAME

(71) Applicant: SAMSUNG ELECTRONICS CO., LTD., Suwon-si (KR)

(72) Inventors: Seunghoon Han, Seoul (KR); Suyeon Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1041 days.

(21) Appl. No.: 16/665,687

(22) Filed: Oct. 28, 2019

(65) Prior Publication Data

US 2020/0174163 A1  Jun. 4, 2020

Related U.S. Application Data

(60) Provisional application No. 62/774,562, filed on Dec. 3, 2018.

(30) Foreign Application Priority Data

Apr. 22, 2019  (KR) .................. 10-2019-0046940

(51) Int. Cl.
*G02B 3/00*  (2006.01)
*G02B 1/00*  (2006.01)
(Continued)

(52) U.S. Cl.
CPC ........... *G02B 3/0062* (2013.01); *G02B 1/002* (2013.01); *G02B 3/00* (2013.01); *G02B 5/1809* (2013.01);
(Continued)

(58) Field of Classification Search
CPC .... G02B 1/002; G02B 5/1809; G02B 5/1871; G02B 5/1876; G02B 13/0055
See application file for complete search history.

(56) References Cited

U.S. PATENT DOCUMENTS 9,946,051 B2  4/2018  Han et al.
9,989,677 B2  6/2018  Shalaev et al.
(Continued)

FOREIGN PATENT DOCUMENTS

CN  106443845 A  2/2017
CN  108415108 A  8/2018
(Continued)

OTHER PUBLICATIONS

Communication dated Apr. 24, 2020, issued by the European Patent Office in counterpart European Application No. 19206140.6.
(Continued)

*Primary Examiner* — Nicholas R. Pasko
(74) *Attorney, Agent, or Firm* — Sughrue Mion, PLLC

(57) ABSTRACT

Provided is a meta-lens including a first region including a plurality of first nanostructures that are two-dimensionally provided in a circumferential direction and a radial direction, wherein the plurality of first nanostructures are provided based on a first rule, and a plurality of second regions surrounding the first region, each of the plurality of second regions including a plurality of second nanostructures that are two-dimensionally provided in a circumferential direction and a radial direction, wherein the plurality of second nanostructures are provided in each of the plurality of second regions based on a plurality of second rules, respectively, that are different from the first rule.

31 Claims, 20 Drawing Sheets

(51) Int. Cl.
*G02B 5/18* (2006.01)
*G02B 13/00* (2006.01)
*G02B 27/00* (2006.01)

(52) U.S. Cl.
CPC ......... *G02B 5/1876* (2013.01); *G02B 5/1895* (2013.01); *G02B 13/0055* (2013.01); *G02B 27/0056* (2013.01); *G02B 2003/0093* (2013.01); *G02B 2207/101* (2013.01)

(56) References Cited

U.S. PATENT DOCUMENTS

| | | | | |
|---|---|---|---|---|
| 2013/0229704 | A1* | 9/2013 | Smolyaninov | G02B 13/14 359/356 |
| 2015/0309218 | A1* | 10/2015 | Shalaev | G02B 5/008 359/241 |
| 2016/0025914 | A1* | 1/2016 | Brongersma | G02B 5/001 359/489.07 |
| 2016/0299337 | A1 | 10/2016 | Arbabi et al. | |
| 2016/0306079 | A1 | 10/2016 | Arbabi et al. | |
| 2016/0316180 | A1* | 10/2016 | Han | G02B 13/0055 |
| 2017/0082263 | A1* | 3/2017 | Byrnes | F21K 9/64 |
| 2017/0219739 | A1* | 8/2017 | Lin | G02B 5/008 |
| 2018/0231700 | A1* | 8/2018 | Ahmed | G02B 5/1814 |
| 2018/0274750 | A1 | 9/2018 | Byrnes et al. | |
| 2018/0292644 | A1* | 10/2018 | Kamali | G02B 26/0875 |
| 2019/0025464 | A1* | 1/2019 | Czaplewski | G02B 3/08 |
| 2019/0154877 | A1* | 5/2019 | Capasso | G02B 1/002 |
| 2021/0247549 | A1* | 8/2021 | Park | G02B 1/002 |

FOREIGN PATENT DOCUMENTS

| | | |
|---|---|---|
| KR | 10-1429093 A | 8/2014 |
| WO | 2017176921 A1 | 10/2017 |
| WO | WO-2017176921 A1 * | 10/2017 ............ G02B 1/00 |

OTHER PUBLICATIONS

Communication dated Jun. 23, 2022 issued by the China National Intellectual Property Administration in Chinese Application No. 201911064510.4.

* cited by examiner

META-LENS AND OPTICAL APPARATUS INCLUDING THE SAME

This application claims the benefit of U.S. Provisional Application No. 62/774,562, filed on Dec. 3, 2018 in the US Patent Office and claims priority from Korean Patent Application No. 10-2019-0046940, filed on Apr. 22, 2019 in the Korean Intellectual Property Office, the disclosures of which are incorporated herein in their entireties by reference.

BACKGROUND

1. Field

Example embodiments of the present disclosure relate to meta-lenses and optical apparatuses including the meta-lenses.

2. Description of the Related Art

Optical sensors using a semiconductor-based sensor arrangement are increasingly used in mobile devices, wearable devices and internet of things.

Although there is a need to miniaturize such devices, there is a difficulty in reducing the thickness of optical lenses included in the devices. In a lens that controls the optical performance by using a curvature, the refractive power increases as the radius of curvature is reduced, and this is because a thickness of the lens in a direction of the optical axis is increased as the radius of curvature is reduced.

Therefore, attempts have been made to realize a flat and thin lens based on a meta-surface. However, when using lenses including a meta-surface high-order diffraction noise may occur, and/or there may still be difficulties in realizing refractive power with respect to a desired wavelength bandwidth and in controlling chromatic aberration.

SUMMARY

One or more example embodiments provide are meta-lenses that may show improved optical performance over a wide wavelength bandwidth.

According to an aspect of an example embodiment, there is provided a meta-lens including a first region including a plurality of first nanostructures that are two-dimensionally provided in a circumferential direction and a radial direction, wherein the plurality of first nanostructures are provided based on a first rule, and a plurality of second regions surrounding the first region, each of the plurality of second regions including a plurality of second nanostructures that are two-dimensionally provided in the circumferential direction and the radial direction, wherein the plurality of second nanostructures are provided in each of the plurality of second regions based on a plurality of second rules, respectively, that are different from the first rule.

The first region has a circular shape, and each of the plurality of second regions have a concentric ring-shape.

A number of the plurality of second regions, the first rule, and the plurality of second rules may be set so that the meta-lens has refractive power with respect to incident light of a predetermined wavelength band.

The predetermined wavelength band may include a visible light wavelength band.

The number of the plurality of second regions, the first rule, and the plurality of second rules may be set such that the meta-lens has a negative Abbe number.

A first interval between adjacent nanostructures of the plurality of first nanostructures and a second interval between adjacent nanostructures of the plurality of second nanostructures, respectively, may be less than $\lambda$, where $\lambda$ is a wavelength of the incident light within the predetermined wavelength band.

Locations of two adjacent nanostructures of the plurality of first nanostructures and the plurality of second nanostructures respectively are represented by polar coordinates ($r_1$, $\varphi_1$) and ($r_2$, $\varphi_2$), and $|r_1-r_2|$ and $|\varphi_1-\varphi_2|$ between the adjacent two nanostructures may be different from each other in at least two locations of the first region and the plurality of second regions.

The plurality of first nanostructures and the plurality of second nanostructures may be provided to have a polar symmetry.

The plurality of first nanostructures and the plurality of second nanostructures may be provided to have a polar symmetry within the first region and the plurality of second regions, respectively.

Polar coordinates of locations of two nanostructures adjacent to each other in the radial direction of the plurality of first nanostructures and the plurality of second nanostructures are ($r_1$, $\varphi_1$) and ($r_2$, $\varphi_1$), and a radial width (WR) of the two adjacent nanostructures may satisfy $WR \leq (3|r_1-r_2|)/4$.

Polar coordinates of locations of two nanostructures adjacent to each other in the circumferential direction of the plurality of first nanostructures and the plurality of second nanostructures are ($r_1$, $\varphi_1$) and ($r_1$, $\varphi_2$), and a circumferential width (WC) of the two adjacent nanostructures may satisfy $WC \leq (3r_1|\varphi_1-\varphi_2|)/4$.

The plurality of first nanostructures and the plurality of second nanostructures may be provided to have a spiral symmetry.

Each of the plurality of first nanostructures and the plurality of second nanostructures may have a cylindrical shape or a polygonal shape.

A height (H) of each of the plurality of first nanostructures and the plurality of second nanostructure may satisfy $\lambda/2 \leq H \leq 6\lambda$, where $\lambda$ is a wavelength within the predetermined wavelength band.

A height (H) of the plurality of first nanostructures and the plurality of second nanostructures may satisfy $\lambda/2 \leq H \leq 3\lambda$, where $\lambda$ is a wavelength within the predetermined wavelength band.

A height of the plurality of first nanostructures and a height of the plurality of second nanostructures may be different from each other in at least two locations of the first region and the plurality of second regions.

Heights of at least two nanostructures included in any one location of the first region and the plurality of second regions may be different from each other.

A difference in heights between the at least two nanostructures may be equal to or less than $2\lambda$ with respect to a wavelength of the incident light $\lambda$ within a predetermined wavelength band.

The plurality of first nanostructures and the plurality of second nanostructures may be provided in a multilayer structure, and the plurality of first nanostructures and the plurality of second nanostructures respectively may include a plurality of lower nanostructures included in a first layer and a plurality of upper nanostructures included in a second layer that is spaced apart from the first layer in a height direction.

The plurality of lower nanostructures and the plurality of upper nanostructures may be misaligned with each other in the height direction.

A distance in the height direction between a lower nanostructure and an upper nanostructure, which are adjacent to each other, among the plurality of lower nanostructures and the plurality of upper nanostructures, may be greater than λ/2 with respect to the wavelength of incident light λ within a predetermined wavelength band.

A shape distribution of the plurality of lower nanostructures and a shape distribution of the plurality of upper nanostructures may be determined such that distributions of performance indexes of the meta-lens based on locations are different from each other.

A shape distribution of the plurality of lower nanostructures and a shape distribution of the plurality of upper nanostructures may be determined such that non-uniformity in focusing performance by the meta-lens based on locations are compensated for by each other.

A radial width of the plurality of second regions may be less than a radius of the first region.

The radial width of each of the plurality of second regions may decrease in a direction away from the first region.

The meta-lens may further include a substrate, wherein the plurality of first nanostructures and the plurality of second nanostructures respectively may include a material having a refractive index greater than that of the substrate.

A difference between a refractive index of the substrate and a refractive index of the plurality of first nanostructures and the plurality of second nanostructures, respectively, may be equal to or greater than 0.5.

The meta-lens may further include a protection layer covering the substrate and the plurality of first nanostructures and the plurality of second nanostructures.

A difference between a refractive index of the protective layer and a refractive index of the plurality of first nanostructures and the plurality of second nanostructures, respectively, may be equal to or greater than 0.5.

According to an aspect of another example embodiment, there is provided a photographing lens including a meta-lens including a first region including a plurality of first nanostructures that are two-dimensionally provided in a circumferential direction and a radial direction, wherein the plurality of first nanostructures are provided based on a first rule, and a plurality of second regions surrounding the first region, each of the plurality of second regions including a plurality of second nanostructures that are two-dimensionally provided in the circumferential direction and the radial direction, wherein the plurality of second nanostructures are provided in each of the plurality of second regions based on a plurality of second rules, respectively, that are different from the first rule, and at least one refractive lens including a light incident surface and a light exit surface, at least one of the light incident surface and the light exit surface being a curved surface.

A number of the plurality of second regions, the first rule, and the second rule of the meta-lens may be set such that the meta-lens has an Abbe number configured to compensate for chromatic aberration caused by the refractive lens.

The number of the plurality of second regions, the first rule, and the second rule of the meta-lens may be set such that the meta-lens has a negative Abbe number.

A focal length $f_m$ of the meta-lens and a focal length $f_1$ of the at least one refractive lens may satisfy $|f_m|>|f_1|$.

According to an aspect of another example embodiment, there is provided a photographing apparatus including a photographing lens including a meta-lens including a first region including a plurality of first nanostructures that are two-dimensionally provided in a circumferential direction and a radial direction, wherein the plurality of first nanostructures are provided based on a first rule, and a plurality of second regions surrounding the first region, each of the plurality of second regions including a plurality of second nanostructures that are two-dimensionally provided in the circumferential direction and the radial direction, wherein the plurality of second nanostructures are provided in each of the plurality of second regions based on a plurality of second rules, respectively, that are different from the first rule, and at least one refractive lens including a light incident surface and a light exit surface, at least one of the light incident surface and the light exit surface being a curved surface, and at least one refractive lens including a light incident surface and a light exit surface, at least one of the light incident surface and the light exit surface being a curved surface, and an image sensor configured to convert an optical image formed by the photographing lens into an electrical signal.

According to an aspect of another example embodiment, there is provided a meta-lens including a first region including a plurality of first nanostructures that are two-dimensionally provided in a circumferential direction and a radial direction, wherein the plurality of first nanostructures are provided based on a first rule, and a plurality of second regions surrounding the first region, each of the plurality of second regions including a plurality of second nanostructures that are two-dimensionally provided in a circumferential direction and a radial direction, wherein the plurality of second nanostructures are provided in each of the plurality of second regions based on a plurality of second rules, respectively, that are different from the first rule, wherein a number of the plurality of second regions, the first rule, and the plurality of second rules are set such that the meta-lens has refractive power with respect to incident light of a predetermined wavelength band.

BRIEF DESCRIPTION OF THE DRAWINGS

The above and/or other aspects will be more apparent and more readily appreciated from the following description of the example embodiments, taken in conjunction with the accompanying drawings, in which.

DETAILED DESCRIPTION

Figure 1:
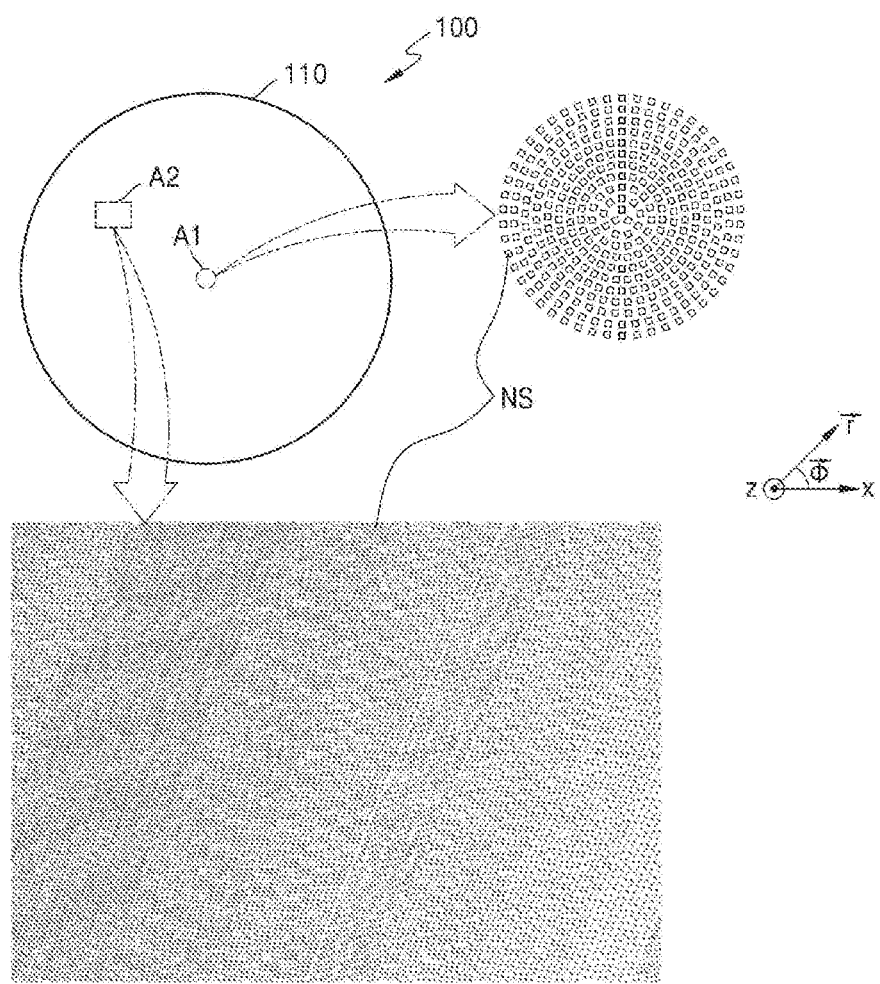
FIG. 1 is a schematic plan view of a structure of a meta-lens according to an example embodiment.

Reference will now be made in detail to example embodiments of which are illustrated in the accompanying drawings, wherein like reference numerals refer to like elements throughout. In this regard, the example embodiments may have different forms and should not be construed as being limited to the descriptions set forth herein. Accordingly, the example embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Hereinafter, example embodiments will be described in detail with reference to the accompanying drawings. The example embodiments are capable of various modifications and may be embodied in many different forms. In the drawings, a size of constituent elements in the drawings may be exaggerated for clarity and convenience of explanation.

It will be understood that when an element or layer is referred to as being "on" or "above" another element or layer, the element or layer may be directly on another element or layer or intervening elements or layers.

It will be understood that although the terms "first", "second", etc. may be used herein to describe various components, but these components are only used to distinguish one component from another. These terms do not define the difference of materials or structures of the constituent elements.

As used herein, the singular forms are intended to include the plural forms as well, unless the context clearly indicates otherwise. Also, when a region "includes" a constituent element, the region may further include another element instead of excluding the other element, unless otherwise differently stated.

Also, in the specification, the term "units" denotes a unit that processes at least one of function or operation, and the "unit" may be realized by hardware or software or a combination of hardware and software.

With respect to operations that constitute a method, the operations may be performed in any appropriate sequence unless the sequence of operations is clearly described or unless the context clearly indicates otherwise. All examples or example terms (for example, etc.) are simply used to explain in detail the technical scope of the present disclosure, and thus, the scope of the present disclosure is not limited by the examples or the example terms as long as it is not defined by the claims.

Figure 2:
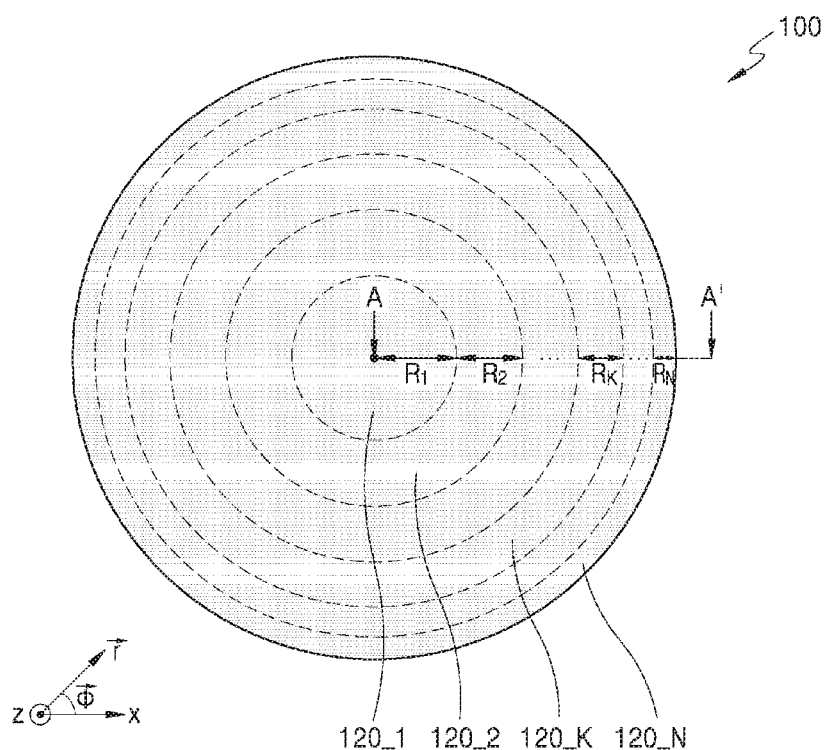
FIG. 2 is a plan view showing that a region of a meta-lens according to an example embodiment that is divided into a plurality of regions.
Figure 3:
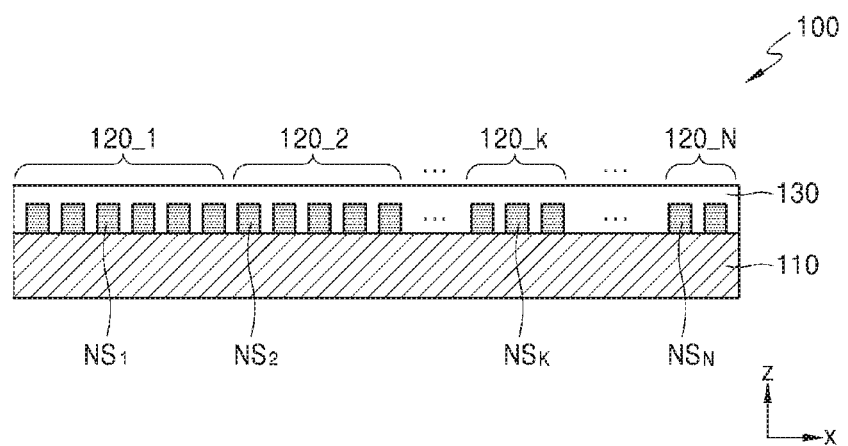
FIG. 3 is a cross-sectional view taken along line AA" of FIG. 2.

FIG. 1 is a schematic plan view of a structure of a meta-lens according to an example embodiment. FIG. 2 is a plan view showing that a region of a meta-lens 100 according to an example embodiment is divided into a plurality of regions. FIG. 3 is a cross-sectional view taken along line AA" of FIG. 2.

The meta-lens 100 may include a plurality of nanostructures NS, and the plurality of nanostructures NS may be two-dimensionally arranged in a radial direction and a circumferential direction. Hereinafter, the center of a circle defining the radial direction and the circumferential direction is the center of the meta-lens 100. The meta-lens 100 may further include a substrate 110 that supports the plurality of nanostructures NS. The plurality of nanostructures NS may be arranged on the substrate 110 and may have a shape dimension of a sub-wavelength. Here, the sub-wavelength denotes a shape dimension less than $\lambda$, when $\lambda$ is a wavelength within the predetermined wavelength band when the plurality of nanostructures NS are arranged to perform a desired optical function with respect to light of a predetermined wavelength band. In an example embodiment, when the plurality of nanostructures NS are arranged to perform a desired optical function with respect to light of the predetermined wavelength band, the plurality of nanostructures NS are arranged to widen the predetermined wavelength band to a desired extent and also to more effectively prevent or reduce the generation of unintended high-order or zero-order diffraction noise. For example, when the nanostructures NS are arranged to function as a lens that exhibits refractive power with respect to light of a wide wavelength band of visible light, there is a limitation in controlling aberration in a rectangular coordinate-based arrangement. In determining a size or shape of the nanostructures NS according to positions of the nanostructures NS, the meta-lens 100 according to the example embodiment realizes a desired performance with respect to light of a wide wavelength band by applying a polar coordinate-based rule, and also, promotes the realization of such performance by arranging the plurality of nanostructures NS in a monolayer.

A position of each of the plurality of nanostructures NS may be expressed as a coordinate of $(r, \varphi)$, wherein the center of the arrangement of the plurality of nanostructures NS, that is, the center of the meta-lens 100, is the origin, r is a distance in a radial direction away from the origin on a plane parallel to the meta-lens 100, and $\varphi$ is a rotation angle with a normal line with respect to the plane as a rotational axis from the origin from a reference line on the plane. In the drawings, the normal line direction is a Z-direction and the reference direction is an X-direction. A shape dimension of the nanostructures NS at a position $(r, \varphi)$ may be determined from a relationship of r and $\varphi$, and, for example, may be expressed as a function of r and/or $\varphi$.

As shown in a magnified portion of a region A1 at the center of the meta-lens 100, the plurality of nanostructures NS may be arranged along a plurality of rings having different radii. When λ is a wavelength within the predetermined wavelength band, an interval between adjacent rings may have a sub-wavelength dimension that is less than λ. Although the interval is shown as constant in the magnified region A1, embodiments are not limited thereto. In other regions of the meta-lens 100, the interval between adjacent rings may not be constant. Also, the size of the plurality of nanostructures NS is shown to be the same in the magnified region A1, but embodiments are not limited thereto. For example, the nanostructures NS positioned in other regions of the meta-lens 100 may have different sizes.

Referring to a magnified portion of a region A2, which is a surrounding region of the meta-lens 100, the nanostructures NS are arranged in a circumferential direction of a plurality of concentric circles with respect to the center of the meta-lens 100. Also, the nanostructures NS do not have a constant size, but have different sizes from each other according to their respective positions. However, the variation of a depicted size is an example and embodiments are not limited thereto.

Referring to FIGS. 2 and 3, the meta-lens 100 may include a first region 120_1, and second region 120_2 through N-th region 120_N. The first region 120_1 is a central region having a circular shape, and the second region 120_2 through N-th region 120_N may have a ring shape sequentially surrounding the first region 120_1. N is a natural number equal to or greater than 3. The plurality of first through N-th regions 120_1 through 120_N may be provided so that shapes, intervals, and arrangement rules, etc. of the nanostructures NS arranged in each of the regions are distinguished and controlled, and the number of regions, the sizes of the regions, etc. may be determined considering an optical function and performance of the meta-lens 100 to be realized.

The first region 120_1 may include a plurality of first nanostructures $NS_1$ two dimensionally arranged in a radial direction and a circumferential direction. The plurality of first nanostructures $NS_1$ may be distributed according to a first rule. Here, the rule is applied to parameters, such as the shape, size such as width and height, interval, arrangement, etc. to the plurality of nanostructures NS, and the parameters may be constant in the same region or may be expressed as a function based on a location of the plurality of nanostructures NS in the meta-lens.

The second region 120_2 may include a plurality of second nanostructures $NS_2$ two dimensionally arranged in the radial direction and the circumferential direction. The plurality of second nanostructures $NS_2$ may be distributed according to a second rule.

The N-th region 120_N may include a plurality of N-th nanostructures $NS_N$ two dimensionally arranged in the radial direction and the circumferential direction. The plurality of N-th nanostructures $NS_N$ may be distributed according to an N-th rule.

As an example, the shape, width, height, arrangement interval, etc. of the plurality of nanostructures $NS_K$ ($1 \leq k \leq N$) provided in each region are depicted as being constant, but the shape, width, height, arrangement interval, etc. of the k-th nanostructures $NS_k$ provided in the k-th region 120_k may be set according to a k-th rule. The k-th rule may denote that the k-th rule is applied to the k-th nanostructures $NS_k$ provided in the k-th region 120_k. According to example embodiments, some or all of the first through k-th rules may be equal to each other.

The substrate 110 and the nanostructures $NS_k$ respectively may include materials having refractive indexes different from each other. A refractive index difference between the substrate 110 and the nanostructures $NS_k$ may be 0.5 or more. The refractive index of the nanostructures $NS_k$ may be greater than that of the substrate 110, but embodiments are not limited thereto, and the refractive index of the nanostructures $NS_k$ may be less than that of the substrate 110.

Referring to FIG. 3, a protective layer 130 may protect the plurality of nanostructures $NS_k$ by covering or encapsulating all of the plurality of nanostructures $NS_k$ and may include a material having a refractive index different from that of the nanostructures $NS_k$. A refractive index difference between the protective layer 130 and the nanostructures $NS_k$ may be 0.5 or more. The protective layer 130 may include a material having a refractive index less than that of the nanostructures $NS_k$, and in this case, the protective layer 130 may be omitted. However, embodiments are not limited thereto, and the refractive index of the protective layer 130 may be greater than that of the nanostructures $NS_k$.

The substrate 110 may include one of the materials, such as glass (fused silica, BK7, etc.), quartz, polymer (poly (methyl methacrylate) (PMMA), SU-8, etc.) and plastic, and may be a semiconductor substrate. The nanostructures $NS_k$ may include at least one of c-Si, p-Si, a-Si, and a Group III-V compound semiconductor (gallium phosphide (GaP), gallium nitride (GaN), gallium arsenide (GaAs), etc.), silicon carbide (SiC), titanium dioxide ($TiO_2$), and silicon nitride (SiN). The protective layer 130 may include a polymer material, such as SU-8, PMMA, etc. or a low refractive material such as silicon dioxide ($SiO_2$).

In this manner, the nanostructures $NS_k$ having a refractive index difference from surrounding materials may change a phase of light passing through the nanostructures $NS_k$. This is due to a phase delay due to the shape dimension of the sub-wavelength of the nanostructures $NS_k$, and the degree of phase delay is determined by detailed shape dimensions and arrangement type of the nanostructures $NS_k$. Various optical functions may be achieved by appropriately setting the degree of phase delay occurring in each of the plurality of nanostructures $NS_k$.

The number of regions and a rule applied thereto may be arranged so that the meta-lens 100 exhibits refractive power with respect to light of a predetermined wavelength band. The predetermined wavelength band may be a visible light wavelength band. The refractive power may be positive refractive power of a convex lens or negative refractive power of a concave lens. The absolute value of the refractive power may be increased by increasing the number of regions. The sign of refractive power is determined according to the size distribution trend of the nanostructures $NS_k$ in each region, and in the case of positive and negative refractive power, the size distribution trends may be opposite to each other. For example, in each region, in an arrangement in which the size of the nanostructures $NS_k$ decreases in the radial direction, positive refractive power may be realized, and in the arrangement in which the size of the nanostructures $NS_k$ increases in the radial direction, negative refractive power may be realized.

The number of regions and the rule applied to each of the regions of the meta-lens 100 may be set so that the meta-lens 100 has a negative Abbe number. A general refractive lens, that is, a refractive lens showing refractive power having a curved surface on an entrance surface or an exit surface of light, has a positive Abbe number, and thus, there is a limit in controlling dispersion to a desired degree.

The Abbe number is related to chromatic dispersion that the meta-lens 100 shows. The chromatic dispersion is caused by a property that a medium generally shows different refractive indices for different wavelengths from each other, and the Abbe number (Vd) is defined as follows.

$$V_d = (n_d - 1)/(n_F - n_C) \tag{1}$$

Here, nd, nF, and nC represent refractive indices of a d-line (587.5618 nm), a C-line (656.2816 nm), and an F-line (486.1327 nm), respectively.

When the chromatic dispersion by the refractive index difference according to wavelengths is large, the refractive power acting on incident light differs according to a color of the incident light, thereby generating chromatic aberration. In order to compensate for the chromatic aberration, generally, when a photographing lens is constituted, a method of using two lenses having a large Abbe number difference is implemented. Since the meta-lens 100 according to the example embodiment may have a negative Abbe number, the meta-lens 100 may more effectively compensate for chromatic aberration generated in other lenses by being employed in a photographing lens. Here, the Abbe number is an example, and embodiments are not limited thereto. The number of regions and the rules applied thereto may be set so that the meta-lens 100 has an Abbe number of a desired value to an extent suitable for chromatic aberration compensation.

The widths of the plurality of regions may be different from each other. For example, a radius of the first region 120_1 having a circular shape may be greater than the radial width of the second region 120_2 having a ring-shape. Also, a width of the ring-shape may be gradually decreased from the third region 120_3 to the N-th region 120_N. However, this is an example, and embodiments are not limited thereto.

A plurality of first nanostructures $NS_1$, a plurality of second nanostructures $NS_2$, ... the N-th nanostructures $NS_N$ may be arranged to have a generally polar symmetry. That is, the plurality of nanostructures $NS_k$ (1≤k≤N) may be arranged to have rotational symmetry at a predetermined angle with a Z axis as the rotation axis. In this case, the shape of the nanostructures $NS_k$ at each position or the interval between adjacent nanostructures $NS_k$ is independent from φ and may be expressed only as a function of r.

Also, the first nanostructures $NS_1$, the second nanostructures $NS_2$, ... the N-th nanostructures $NS_N$ may be arranged to have a polar symmetry in a k-th region 120_k to which each nanostructures $NS_k$ belongs. The first nanostructures $NS_1$ arranged in the first region 120_1 may be arranged to have a rotational symmetry of a predetermined angle $\Delta\varphi_1$, and the second nanostructures $NS_2$ arranged in the second region 120_2 may have rotational symmetry of an angle $\Delta\varphi_2$ different from the predetermined angle $\Delta\varphi_1$. The angle $\Delta\varphi_k$ of the rotational symmetry may decrease as k increases, that is, an area away from the center of the meta-lens 100. However, this is an example. These rotational symmetry angles may not be different in all regions and may be different in at least two regions.

Figure 4:
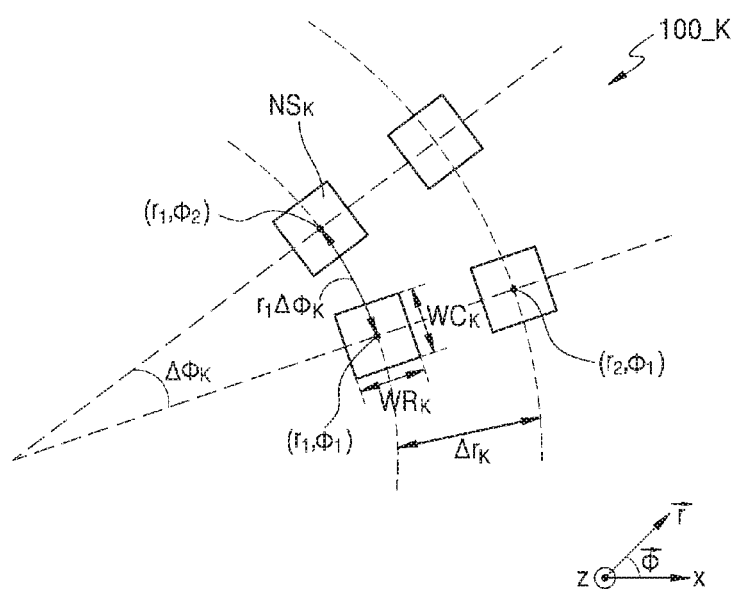
FIG. 4 is a conceptual diagram for explaining a relationship between an interval and a width of adjacent nanostructures by exemplifying a k-th region of the meta-lens according to an example embodiment.
Figure 5:
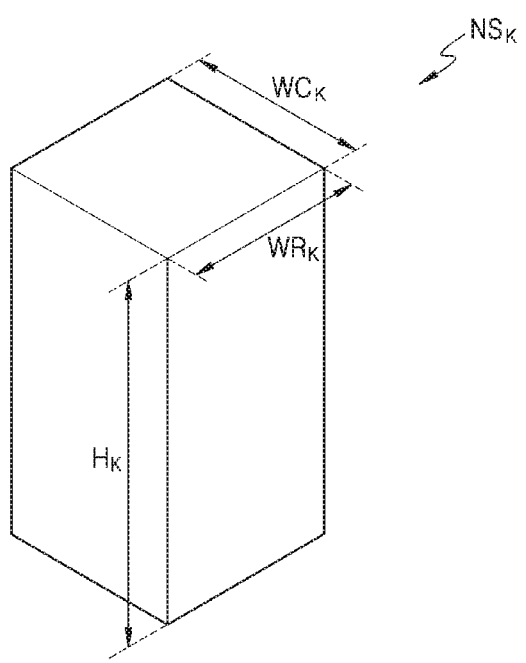
FIG. 5 shows an exemplary shape of a nanostructure included in the meta-lens according to an example embodiment.

FIG. 4 is a conceptual view illustrating the relationship between an interval and a width of adjacent nanostructures by exemplifying the k-th region of the meta-lens 100_K according to an example embodiment, and FIG. 5 shows an exemplary shape of a nanostructure included in the meta-lens 100_K according to an example embodiment.

Referring to FIG. 4, the k-th nanostructures $NS_k$ provided in the k-th region 120_k may be arranged to have a polar symmetry. The plurality of k-th nanostructures $NS_k$ may be arranged so that the arrangement has a rotational symmetry of a rotation angle $\Delta\varphi_k$ with the Z-axis as a rotation axis. The k-th nanostructures $NS_k$ may be arranged in the radial direction and the circumferential direction, and the angular interval in the circumferential direction may be constant in the same region as $\Delta\varphi_k$.

The radial direction interval of the k-th nanostructures $NS_k$ may be constant as $\Delta r_k$, or may have different values depending on the locations. For example, according to the k-th rule applied to the k-th region 120_k, $\Delta r_k$ may gradually increase or decrease as r increases in the region. Here, $\Delta r_k$ of all regions may not be different from each other and may differ from each other in at least two regions.

Two widths of the nanostructures NS, that is, a radial width $WR_k$ and a circumferential width $WC_k$, are dimensions of a subwavelength, and also, may be determined in the relationship between the circumferential interval and the radial interval between adjacent nanostructures $NS_k$. In the circumferential interval and the radial interval between the nanostructures $NS_k$, the interval may be a distance between the centers of the adjacent nanostructures $NS_k$.

The radial width $WR_k$ of the nanostructures $NS_k$ located at the position of the polar coordinates (r1, $\varphi_1$) may be determined to be ¾ or less of an interval $\Delta r$ to the nanostructures $NS_k$ at the position of the polar coordinates (r2, $\varphi_i$) adjacent in the radial direction.

That is, the radial width $WR_k$ of the nanostructures $NS_k$ may satisfy the following condition.

$$WR_k \leq 3(\Delta r)/4 = (3|r_1 - r_2|)/4 \tag{2}$$

The circumferential width $WC_k$ of the nanostructures $NS_k$ located at positions of the polar coordinates (r1, $\varphi_1$) may be determined to be ¾ or less of an interval $r_1 \Delta\varphi_k$ to nanostructure located on the polar coordinates (r1, $\varphi_2$) adjacent in the circumferential direction.

That is, the circumferential width $WC_k$ of the nanostructures $NS_k$ may satisfy the following condition.

$$WC_k \leq 3(r_1)*(\Delta\varphi_k)/4 = (3r_1*|\varphi_1-\varphi_2|)/4 \tag{3}$$

As depicted in FIG. 5, the nanostructures $NS_k$ may have a rectangular column shape having two widths $WR_k$ and $WC_k$ and a height $H_k$, respectively. The two widths $WR_k$ and $WC_k$ of the rectangular cross-section of the rectangular column may be arranged on a substrate so that the two widths $WC_k$ and $WR_k$ respectively are in the circumferential direction and the radial direction. The height $H_k$ of the nanostructures $NS_k$ may satisfy the following condition when λ is a wavelength within the predetermined wavelength band.

$$\lambda/2 \leq H_k \leq 6\lambda \tag{4}$$

The nanostructures $NS_k$ may have a polygonal column.

Regarding the shape dimension of the nanostructures $NS_k$, only a cross-sectional width, which is perpendicular to the height, may have a subwavelength dimension, and the height may be equal to or greater than a wavelength of light. However, the embodiments are not limited thereto, and the height may also be set to have a subwavelength dimension.

When the height of the nanostructures $NS_k$ has a dimension greater than the wavelength, a response to a wider range of light may be obtained from the nanostructures $NS_k$, and thus, it is possible to configure a lens that controls light of a wider wavelength band.

When an aspect ratio of the nanostructures $NS_k$ is greater than 1, that is, a shape of the nanostructures $NS_k$ having a width of a subwavelength and a height of a wavelength or above, the manufacturing of the nanostructures $NS_k$ becomes more difficult as the aspect ratio increases. Therefore, the range of (3) or (4) may be set considering the optical performance related to the aspect ratio.

Figure 6:
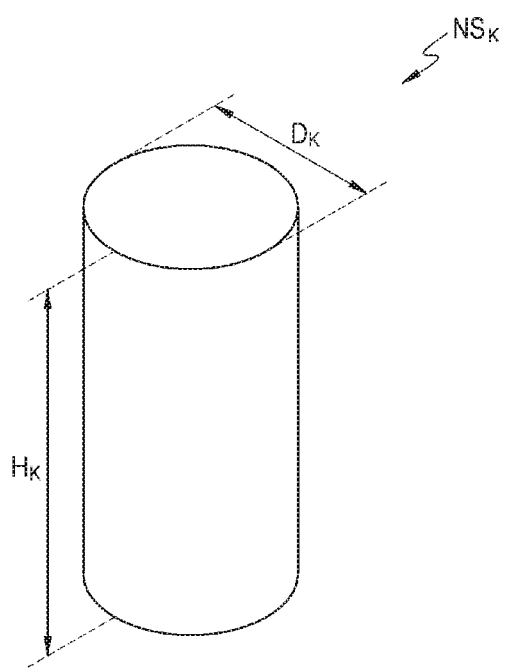
FIG. 6 is a perspective view showing another exemplary shape of a nanostructure included in the meta-lens according to an example embodiment.

FIG. 6 is a perspective view showing another exemplary shape of the nanostructures $NS_k$ included in the meta-lens 100_K according to an example embodiment.

The nanostructures $NS_k$ may have a circular column shape having a diameter of $D_k$ and a height of $H_k$. In this shape, $D_k$ may satisfy the ranges (2) and (3) above.

Figure 7:
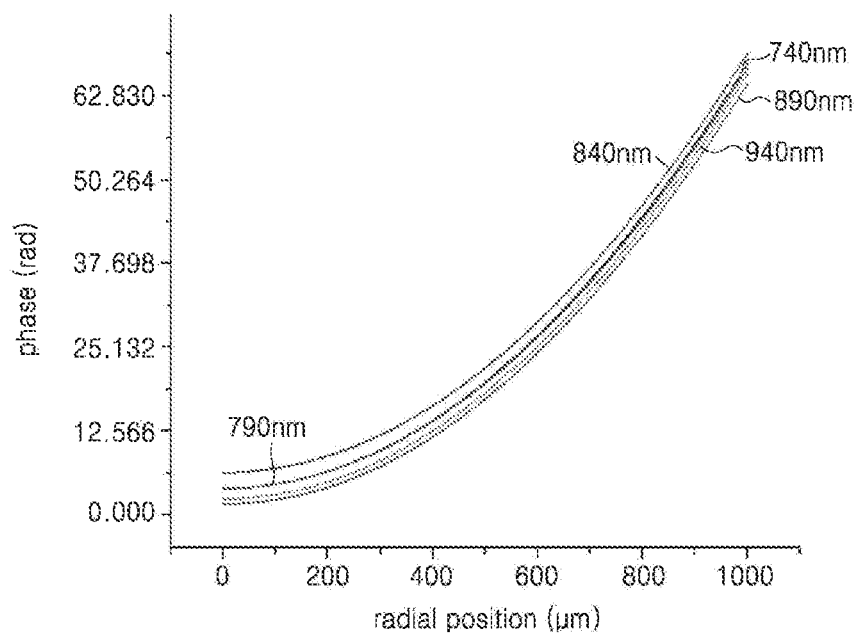
FIG. 7 is a graph showing an ideal phase distribution as design data to be realized by a meta-lens according to an example embodiment.
Figure 8:
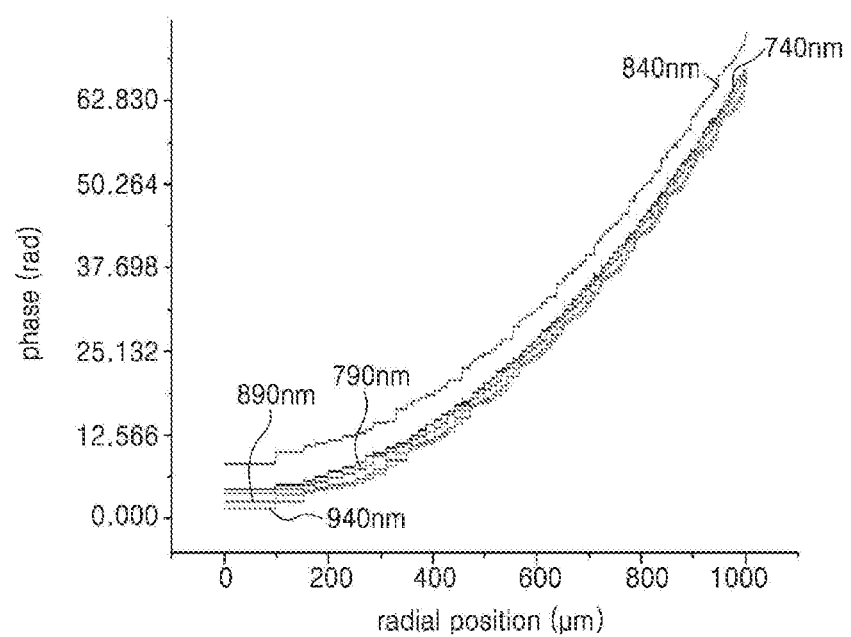
FIG. 8 is a graph showing a phase distribution shown by a manufactured meta-lens according to an example embodiment.

FIG. 7 is a graph showing an ideal phase distribution as design data to be realized by the meta-lens 100 according to an example embodiment, and FIG. 8 is a graph showing a phase distribution shown by a manufactured meta-lens according to an example embodiment.

As described above, the optical function realized by the meta-lens 100 is attributed to the property that the phase of the incident light is modulated according to locations by the plurality of nanostructures NS constituting the meta-lens 100. FIG. 8 illustrates that the phase distribution of the meta-lens 100 according to the locations is realized at a level very similar to design data.

Figure 9:
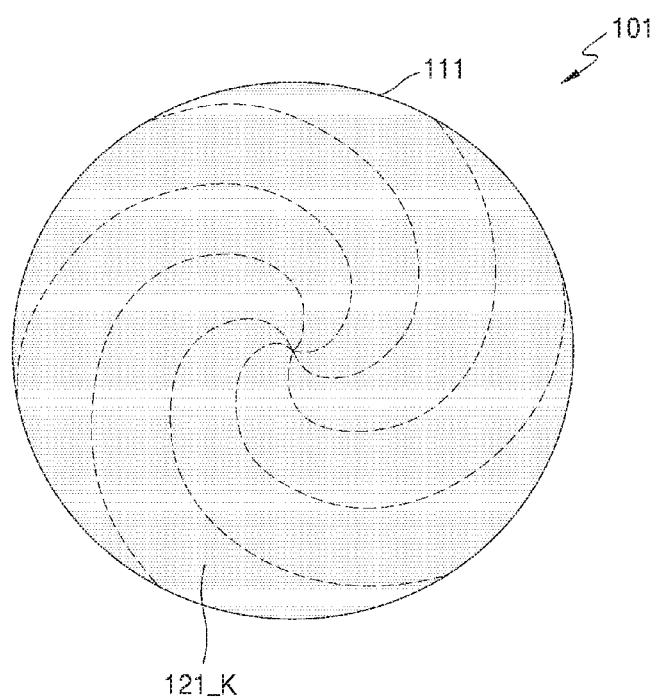
FIG. 9 is a plan view showing a plurality of region arrangements of a meta-lens according to an example embodiment.

FIG. 9 is a plan view showing a plurality of region arrangements of a meta-lens 101 according to an example embodiment;

The meta-lens 101 includes a plurality of regions 121_k including a plurality of nanostructures arranged on a substrate 111. The meta-lens 101 according to the example embodiment is different from the meta-lens 100 of FIG. 2 in that a plurality of nanostructures are arranged to have a spiral symmetry in the meta-lens 101. The trajectory according to the same rule applied to the arrangement of the plurality of nanostructures NS is spiral. In each of the spiral regions 121_k, the shape, size, interval, height, etc. of the nanostructures NS may be set to be constant or an arrangement rule of a region may be applied in the corresponding region.

Besides the division of regions depicted in FIGS. 2 and 9, various division of regions may be applied to the meta-lens according to example embodiments for realizing various optical functions. For example, the division of region and the rule in the region may be set so that an incident beam is shaped to a specific shape or the incident beam is focused while refracting an optical axis direction of the incident beam to a specific direction.

Figure 10:
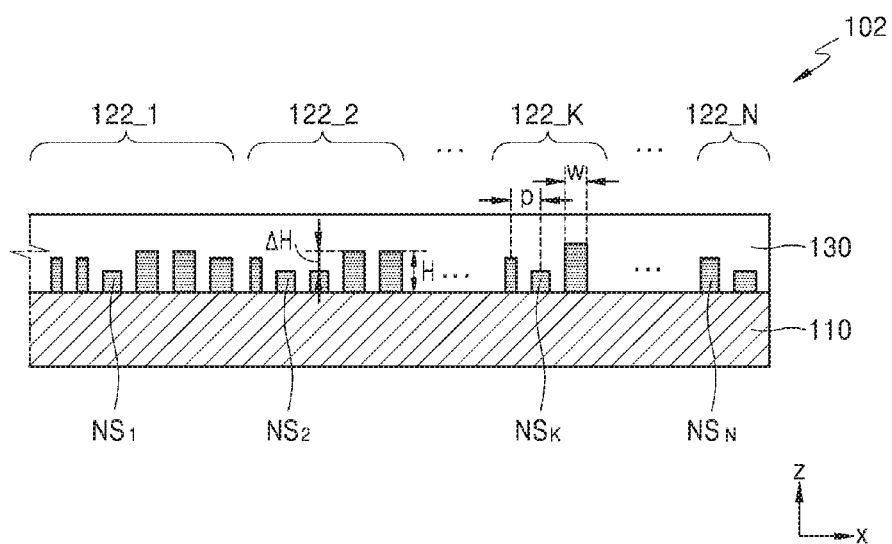
FIG. 10 is a schematic cross-sectional view of a structure of a meta-lens according to an example embodiment.
Figure 11:
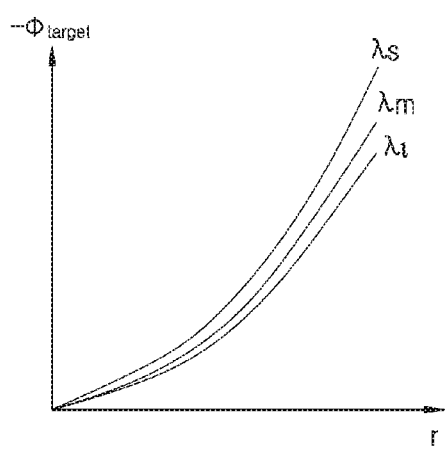
FIG. 11 is a graph conceptually showing a target phase by wavelengths to be satisfied by nanostructures provided in the respective regions of the meta-lens of FIG. 10.

FIG. 10 is a schematic cross-sectional view of a structure of a meta-lens according to an example embodiment. FIG. 11 is a graph conceptually showing a target phase by wavelengths to be satisfied by nanostructures provided in the respective regions of the meta-lens of FIG. 10.

FIG. 10 is a view corresponding to a section taken along line A-A' of FIG. 2 that is a plan view. A meta-lens 102 may include a first region 122_1, a second region 122_2, . . . , and an N-th region 122_N. A nanostructure $NS_k$ arrangement rule may be determined in each k-th region 122_k (1≤k≤N) such that the meta-lens 102 has a refractive power with respect to light of a predetermined wavelength band. The meta-lens 102 according to the example embodiment is different from the meta-lens 100 described with respect to FIG. 3 in that different heights H to each other are applied to at least two of the nanostructures $NS_k$ included in the same region among the first region 122_1, the second region 122_2, . . . , and the N-th region 122_N. Although in the drawing the nanostructures $NS_k$ having different heights are provided in all regions, embodiments are not limited thereto. For example, in some regions, the heights of the nanostructures $NS_k$ may be identical to each other.

A height difference ΔH between at least two of the nanostructures $NS_k$ may be equal to or less than 2λ with respect to the wavelength λ within the predetermined wavelength band. The height H of the second nanostructures $NS_k$ may be in a range that λ/2≤H≤3λ with respect to the wavelength λ within the predetermined wavelength band.

Based on the nanostructures $NS_k$ having different heights to each other, chromatic aberration, for example, dispersion according to a wavelength, in applying refractive power to light of a wide wavelength band may be more freely adjusted.

To show refractive power with respect to incident light, a predetermined arrangement rule may be applied to the nanostructures $NS_k$ disposed in the respective regions 122_k. A target phase $\varphi_{target}$ may be set for each region as in FIG. 11. The target phase is set to indicate a phase change range of 2π with respect to a central wavelength $\lambda_m$ in a given region in the shape as illustrated in FIG. 2, and in this regard the regions 122_k may be a 2π zone. In the vertical axis of the graph of FIG. 11, the negative(−) sign is shown as an example of being a phase for indicating positive refractive power.

The target phase $\varphi_{target}$, as illustrated in FIG. 11, appears to be slightly different with respect to light of wavelengths $\lambda_l$, $\lambda_m$, and $\lambda_s$ that are different from one another. The different wavelengths $\lambda_l$, $\lambda_m$, and $\lambda_s$ may be, for example, red, green, and blue wavelength bands. To implement a desired target phase with respect to light of a predetermined wavelength, a rule regarding the shape, size, or arrangement of the nanostructures $NS_k$ arranged in a plurality of 2π zones may be determined. In the following description, an expression "shape distribution" may be used together as one meaning the "shape, size, or arrangement". A degree of a change in the target phase $\varphi_{target}$ to the light of wavelengths different from each other relates to dispersion Δφ, and a wavelength range including the exampled wavelengths $\lambda_l$, $\lambda_m$, and $\lambda_s$ relates to a bandwidth BW. A shape distribution such as the shape, size, or arrangement of each of the nanostructures $NS_k$ that may implement the dispersion Δφ in a desired range with respect to a desired bandwidth BW may be set from a prepared phase-dispersion map. The phase-dispersion map may be created by a method of marking a shape distribution of the nanostructures $NS_k$ at a position corresponding to the phase and dispersion at the central wavelength by various combinations of a width and a pitch thereof while setting the nanostructures $NS_k$ at a constant height. A design dimension that shows desired performance at a desired position may be selected from the map. When the height variation is introduced, a plurality of phase-dispersion maps having different height conditions may overlap each other, that is, a range of selecting the shape of the nanostructures $NS_k$ may increase. As such, the shape and arrangement of the nanostructures $NS_k$ may be determined to increase a concentrating wavelength band and more freely adjust chromatic aberration.

Although, in FIG. 10, the height H, the width w, and the pitch p of the nanostructures $NS_k$ are randomly illustrated, this is an example, and embodiments are not limited thereto. A predetermined rule may be set and applied not only to the width w and the pitch p, but also to the height H of the nanostructures $NS_k$ for each region 122_k.

Figure 12:
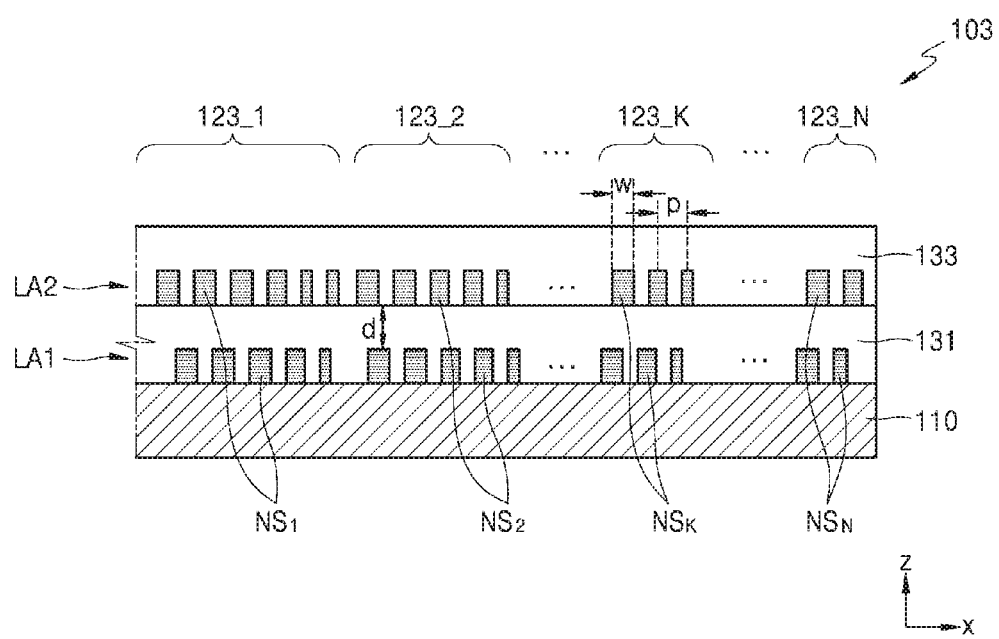
FIG. 12 is a schematic cross-sectional view of a structure of a meta-lens according to an example embodiment.

FIG. 12 is a schematic cross-sectional view of a structure of a meta-lens 103 according to an example embodiment.

FIG. 12, like FIG. 10, is a view corresponding to a cross-section taken along line A-A" in the plan view of FIG. 2. The meta-lens 103 may include a first region 123_1, a second region 123_2, . . . , and an N-th region 123_N. A nanostructures $NS_k$ arrangement rule may be determined in each of the first region 123_1, the second region 123_2, . . . , the N-th region 123_N such that the meta-lens 103 may show refractive power with respect to light of a predetermined wavelength band.

The meta-lens 103 according to the example embodiment is different from the above-described meta-lenses 100, 101, and 102 in that the nanostructures $NS_k$ included in the first region 123_1, the second region 123_2, . . . , and the N-th region 123_N are arranged in a multilayer structure. The nanostructures $NS_k$ may be divided into a plurality of lower nanostructures forming a first layer LA1 and a plurality of upper nanostructures forming a second layer LA2.

The first layer LA1 and the second layer LA2 are spaced apart from each other in a height direction (Z direction), and to form such layers, a low refractive index material layer 131 including a material having a refractive index lower than that of the lower nanostructures and covering the lower nanostructures may be formed. The upper nanostructures may be disposed on the low refractive index material layer 131. To cover and protect the upper nanostructure, a protection layer 133 including a material having a refractive index lower than that of the upper nanostructures may be further provided. The protection layer 133 may be omitted.

The lower nanostructures forming the first layer LA1 and the upper nanostructures forming the second layer LA2 may face each other to be misaligned with each other. For example, the center axes of at least some of the lower nanostructures and the upper nanostructures vertically facing each other may be misaligned with each other. Some of the lower nanostructures and the upper nanostructures that face each other may be aligned with each other.

An interval d between a lower nanostructure and an upper nanostructure, which are adjacent to each other, among the lower nanostructures and the upper nanostructures, that is, a separation distance in the height direction (Z direction), may be greater than $\lambda/2$ with respect to the wavelength $\lambda$ within the predetermined wavelength band.

The arrangement of the nanostructures $NS_k$ in a multilayer as illustrated in FIG. 12 may reduce deterioration of performance that may occur at some positions even when the shape of each of the nanostructures $NS_k$ is set to a desired target phase.

Figure 13:
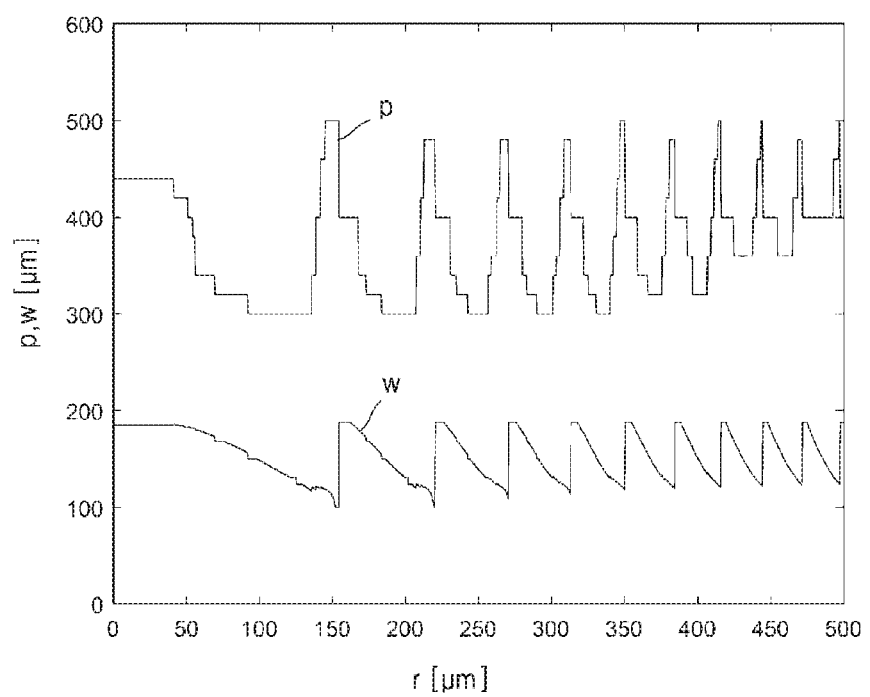
FIG. 13 shows an example of design data of widths and pitches by locations of lower structures arranged in a first layer in the meta-lens of FIG. 12.

The target phase in each region illustrated in FIG. 11 may be applied to the meta-lens 103 of FIG. 12. For example, the sizes and arrangement of the nanostructures $NS_k$ arranged in the region 123_$k$ of the meta-lens 103 in a double layer structure may be set to satisfy the target phase as in FIG. 11 for each region. FIG. 13 illustrates an example of design data of the width w and the pitch p by locations of the nanostructures $NS_k$ arranged in the first layer LA1 of the meta-lens 103 of FIG. 12.

Figure 14:
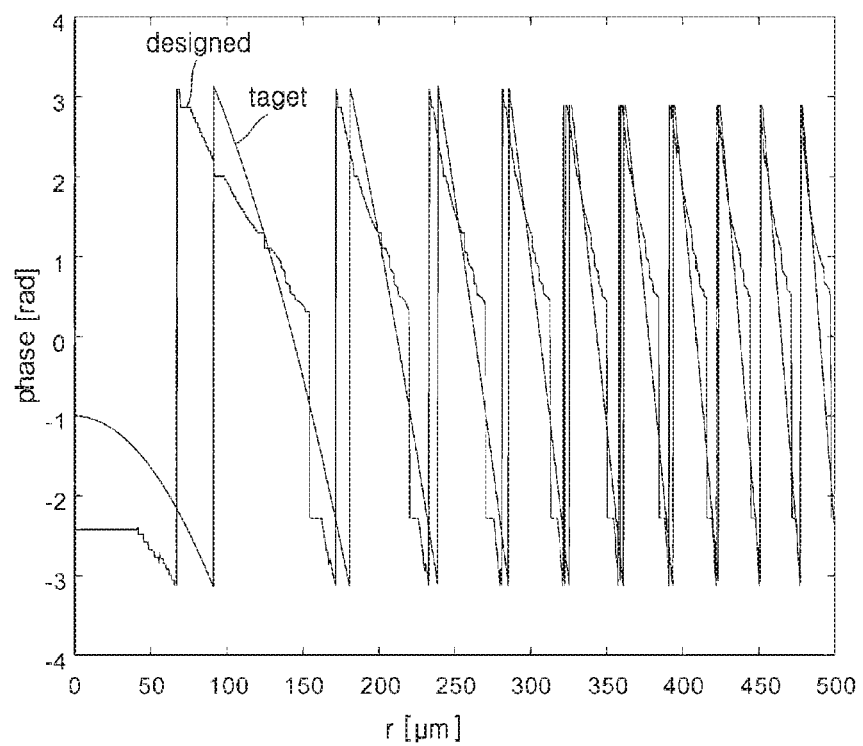
FIG. 14 is a graph showing a comparison between a target phase value and a phase value by nanostructures designed as in FIG. 13.

FIG. 14 is a graph of a comparison between a target phase value and a phase value by the nanostructures $NS_k$ designed as in FIG. 13. In the graph, a target phase value graph is indicated by "target", and a phase value graph by the nanostructures $NS_k$ designed to implement the target phase is indicated by "designed". In the graph, the two graphs are not completely congruous with each other and have an error. Furthermore, a degree of mismatch appears to vary according to the position of the nanostructures $NS_k$.

Figure 15:
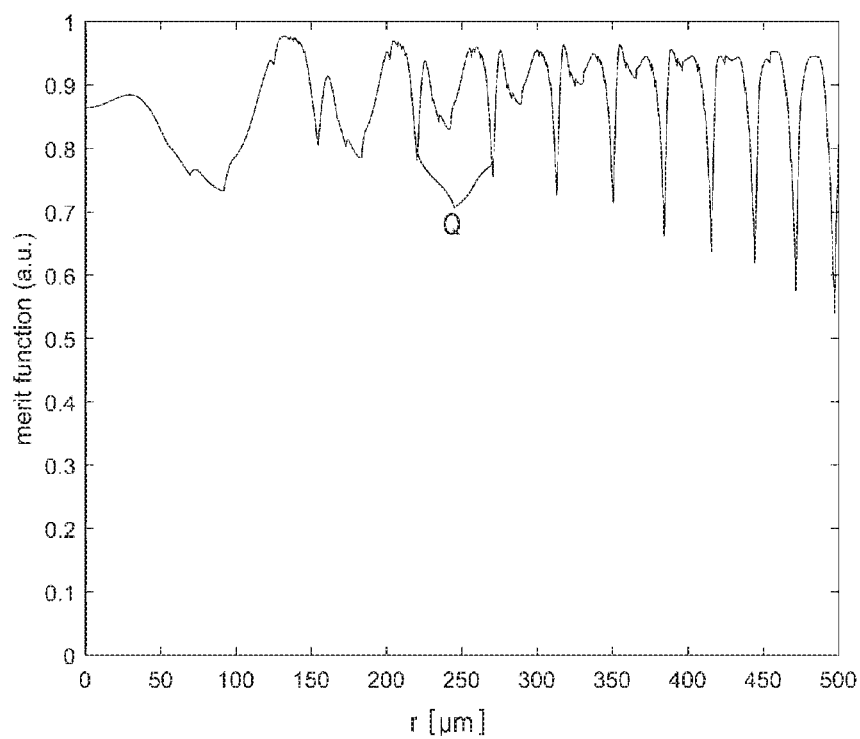
FIG. 15 is a graph showing a performance index obtained by quantifying a difference between the target value and the design value in FIG. 14.

FIG. 15 is a graph of a performance index obtained by quantifying a difference between the target value and the design value in FIG. 14. The performance index is obtained such that correlation degree between a target transmissivity (transmission intensity and transmission phase) and an actual transmissivity in an entire wavelength band to be considered is integrated and quantified by locations in a radial direction. The graph may show the merit function. The correlation degree on the vertical axis of the graph being closer to 1 is a more desirable value, and a position where the correlation degree is the lowest may be known from points Q indicating the lower extreme points.

FIGS. 13 to 15 illustrate design data of the first layer LA1, and as multiple layers are introduced, correlation properties that are non-uniformly low may be compensated. For example, the rule regarding the size and arrangement of the nanostructures $NS_k$ forming the second layer LA2 may be determined such that, as illustrated in FIG. 15, a position where correlation is low in the first layer LA1, for example, the extreme point Q, may be moved to another position. By making the position where correlation is low appear to be different in the first layer LA1 and the second layer LA2 and overlapping dispersion and phase features of each layer, when desired light of a predetermined wavelength band is to be concentrated while maintaining dispersion in an appropriate range, performance deterioration that may occur at some particular positions may be reduced.

The shape distribution of the nanostructures $NS_k$ provided in the first layer LA1 and the shape distribution of the nanostructures $NS_k$ provided in the second layer LA2 may be determined to have different distributions of performance indexes by locations from each other. The shape distribution of the nanostructures $NS_k$ provided in the first layer LA1 and the shape distribution of the nanostructures $NS_k$ provided in the second layer LA2 may be determined such that degree of non-uniformity of focusing performance by the respective shape distributions are different from each other. The shape distribution of the nanostructures $NS_k$ provided in the first layer LA1 and the shape distribution of the nanostructures $NS_k$ provided in the second layer LA2 may be determined such that degree of non-uniformity of focusing performance by locations in each layer may be compensated for by each other. Any one of the first layer LA1 and the second layer LA2 may be set to reduce the non-uniformity of focusing performance by the other layer.

According to an example embodiment, when the nanostructures $NS_k$ of the meta-lens 103 are arranged in multiple layers, the number of $2\pi$ zones to which a rule of a predetermined unit is applied may be reduced. The number of $2\pi$ zones 123_1, 123_$k$, and 123_N may be set to a level appropriate to achieve a desired refractive power, and the number of regions increases for high refractive power. By using the multilayer arrangement, the number of regions formed in a radial direction may be reduced.

Although the number of multiple layers is set to, for example, two, embodiments are not limited thereto. For example, three or more layers may be selected. When the number of multiple layers is LN, the number of $2\pi$ zones formed in the radial direction may be reduced to 1/LN. Furthermore, the dispersion range may be reduced to 1/LN.

Figure 16:
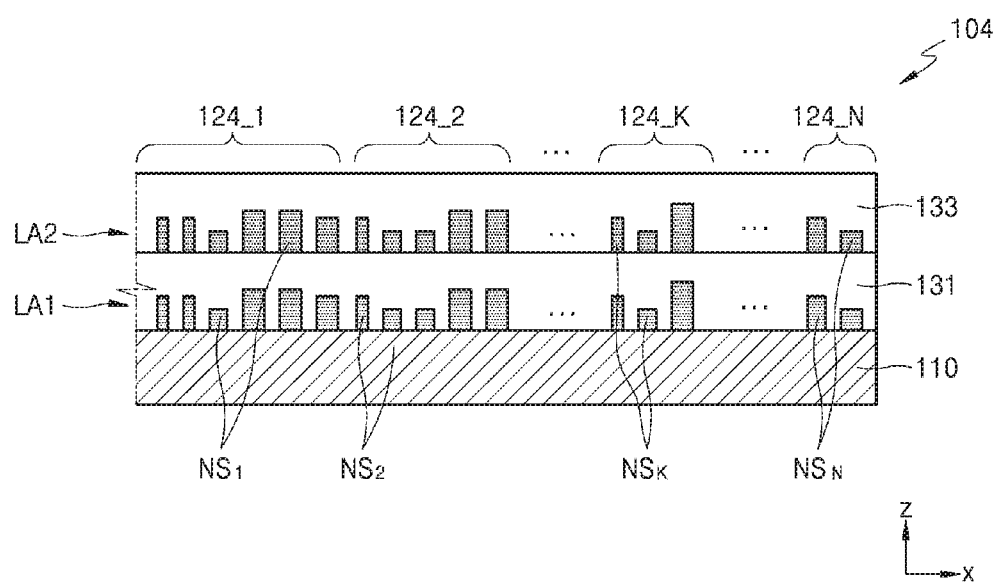
FIG. 16 is a cross-sectional view of a structure of a meta-lens according to an example embodiment.

FIG. 16 is a schematic cross-sectional view of a structure of a meta-lens 104 according to an example embodiment.

The meta-lens 104 may include a first region 124_1, a second region 124_2, . . . , and an N-th region 124_N. A nanostructures $NS_k$ arrangement rule may be determined in each of the first region 124_1, the second region 124_2, . . . , the N-th region 124_N such that the meta-lens 104 may show refractive power with respect to light of a predetermined wavelength band.

In the example embodiment, at least two of the nanostructures $NS_k$ forming the first layer LA1 of the meta-lens 104 that are included in the same region may have different heights to each other. Furthermore, at least two of the nanostructures $NS_k$ forming the second layer LA2 of the meta-lens 104 that are included in the same region may have different heights to each other. As described in the example embodiment of FIG. 10, by applying height variation to each layer, a design value to implement appropriate phase and dispersion at each position may be more easily set. In particular, when the multilayer nanostructures $NS_k$ arrangement is introduced to compensate for the deterioration of performance of each layer, the selection of a design value of the nanostructures $NS_k$ to compensate for the deterioration of performance in one layer in another layer corresponding to a low correlation position may be more easier. Furthermore, a more effective compensation of the phase and the dispersion performance between layers may be possible.

Although the drawing illustrates that the nanostructures $NS_k$ having various heights are applied to both of the first layer LA1 and the second layer LA2, this is merely an example and embodiments are not limited thereto. For example, the nanostructures $NS_k$ may be arranged with a constant height in one of the first layer LA1 and the second layer LA2, and the nanostructures $NS_k$ having different heights may be selected in the other layer at an appropriate position as necessary. Furthermore, although the drawing illustrates that a multilayer is introduced to all regions 124_k, embodiments are not limited thereto. A parameter to determine the rule to be applied to each region 124_k may include the provision of a multilayer or height variation.

The meta-lenses 100, 101, 102, 103 and 104 described above may be employed in various optical devices since the meta-lenses 100, 101, 102, 103 and 104 have a thin structure favorable for miniaturization of the optical device and a higher degree of freedom for controlling optical performance.

Figure 17:
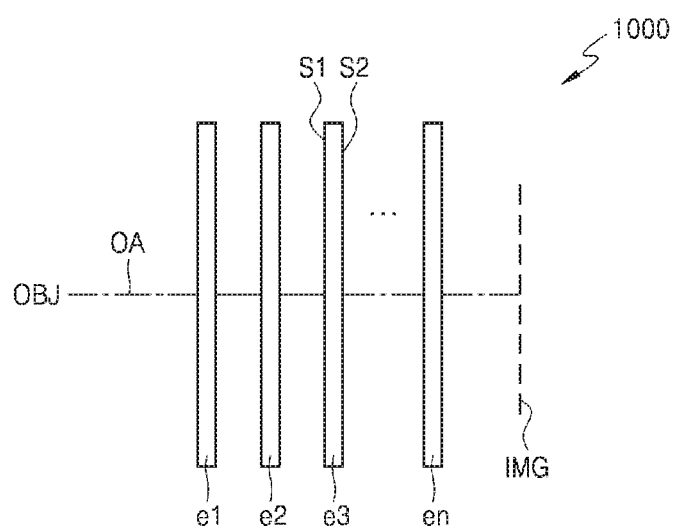
FIG. 17 shows a optical arrangement of a photographing lens according to an example embodiment.

FIG. 17 shows a schematic optical arrangement of a photographing lens 1000 according to an example embodiment.

The photographing lens 1000 includes a plurality of lenses e1, e2 . . . en. The plurality of lenses e1, e2 . . . en may be configured in various numbers so that an image of an object OBJ is focused on an image plane IMG, and also, considering desired aberrations compensation. Also, an aperture stop for controlling the amount of light may be disposed at an appropriate position together with the plurality of lenses e1, e2 . . . en.

Some of the plurality of lenses e1, e2, . . . , en may be the meta-lenses 100 and 101 according to the example embodiments as described above, and the remaining lenses may be general refractive lenses in which at least one of a light entrance surface S1 and a light exit surface S2 is a curved surface. The number, location, and shape of the meta-lens and the refractive lens may be determined considering the focal length and a field of view of the photographing lens 1000 to be realized. Also, the photographing lens 1000 may be realized as a zoom lens whose focal length is controlled within a range of a telephoto position to a wide angle position by allowing the at least one of the plurality of lenses e1, e2, . . . , en to move along the optical axis OA. Also, at least one of the plurality of lenses e1, e2 . . . en may be configured to move in a direction perpendicular to the optical axis OA for compensation.

Figure 18:
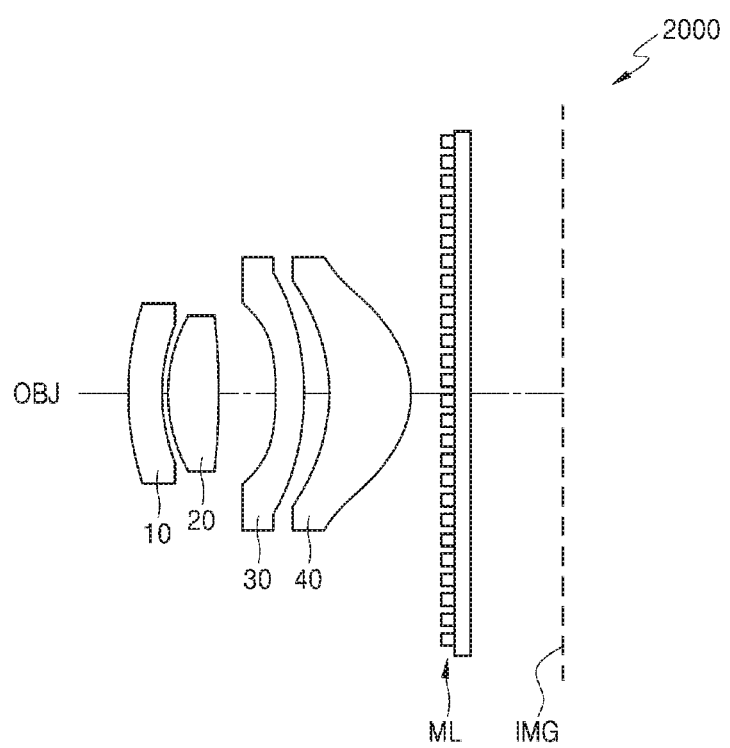
FIG. 18 shows a optical arrangement of a photographing lens according to an example embodiment.

FIG. 18 shows a schematic optical arrangement of a photographing lens 2000 according to an example embodiment.

The photographing lens 2000 includes a first lens 10, a second lens 20, a third lens 30, a fourth lens 40, and a meta lens ML as a fifth lens sequentially arranged from a side of an object OBJ. The first lens 10, the second lens 20, the third lens, and the fourth lens 40 are general refraction lenses in which a curved surface is applied to a light entrance surface and/or a light exit surface, and the fifth lens is a planar meta-lens ML. As the meta-lens ML, the meta-lenses 100 and 101 described above or a meta-lens of a modified example may be employed.

The meta-lens ML may have an Abbe number capable of compensating for the chromatic aberration caused by the first through fourth lenses 10, 20, 30, and 40. The meta-lens ML may have a negative Abbe number for more effective chromatic aberration compensation.

The meta-lens ML may perform a chromatic aberration compensation as a main role and may be set to have little refractive power. For example, the meta-lens ML may have a very weak, close to zero positive or negative refractive power, and thus, may show a very long focal length.

A focal length $f_m$ of the meta-lens ML and focal lengths $f_l$ of the first through fourth lenses 10, 20, 30, and 40 may satisfy the following conditions.

$$|f_m| > |f_l| \qquad (5)$$

The focal length $f_m$ of the meta-lens ML may be greater than a focal length Ifl of a lens that shows the longest focal length among the first through fourth lenses 10, 20, 30, and 40. That is, the meta-lens ML may be configured to have the weakest refractive power among the lenses constituting the photographing lens 2000.

The setting of the meta-lens ML in this manner may be advantageous in designing the photographing lens 2000 in that the meta-lens ML may be added for the purpose of correcting only the chromatic aberration without substantially affecting the remaining performances of a general photographing lens constituted of general refractive lenses of the related art.

Figure 19:
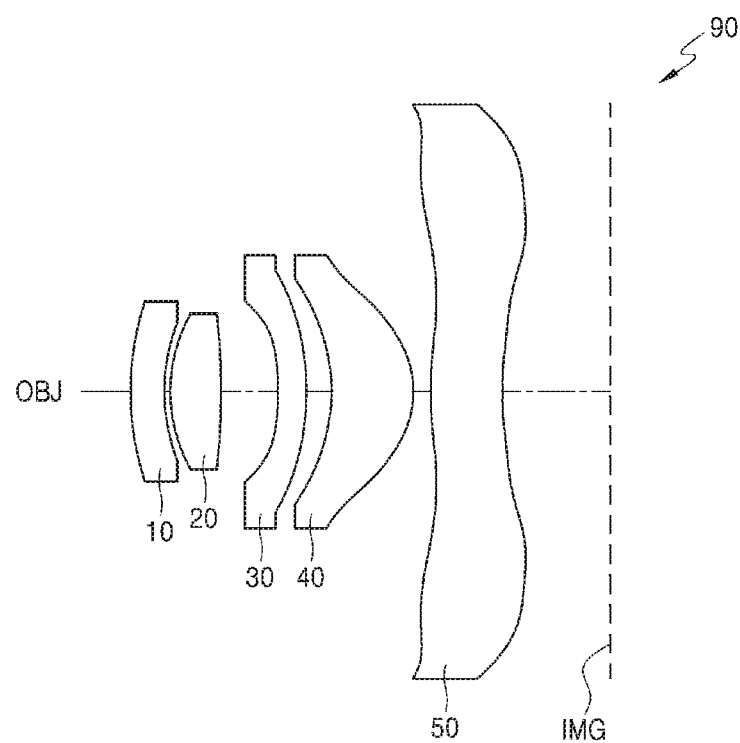
FIG. 19 shows a optical arrangement of a photographing lens according to a related example.

FIG. 19 shows a schematic optical arrangement of a photographing lens 90 according to a related example.

The photographing lens 90 includes a first lens 10, a second lens 20, a third lens 30, a fourth lens 40, and a fifth lens 50 sequentially arranged from an object OBJ. The first through fifth lenses 10, 20, 30, 40, and 50 are all general refractive lenses to which a curved surface is applied to an entrance surface and/or an exit surface.

The photographing lens 90 according to the related example may show the same as or similar to the performance as the photographing lens 2000 of FIG. 18. For example, the photographing lens 90 may show the same focal length and field of view as the photographing lens 2000 of FIG. 18. However, the photographing lens 90 according to the related example has a drawback in downsizing an overall length due to the thickness of the fifth lens 50 and the Abbe number limit, and is also unfavorable in correcting the aberration.

In other words, an overall length, that is, a length from an entrance surface of the first lens 10 to an image plane IMG of the photographing lens 2000 of FIG. 18 according to the example embodiment may be less than that of the photographing lens 90 according the related example, and also, since the meta-lens 100 having various Abbe numbers, such as a negative Abbe number, etc. is provided, a high aberration correction performance may be obtained.

In the descriptions with reference to FIGS. 11 and 12, the compensating the chromatic aberration by the meta-lens ML has been mainly described, but this is an example, and the meta-lens ML may be configured to compensate other aberrations, for example, spherical aberration or coma aberration.

Figure 20:
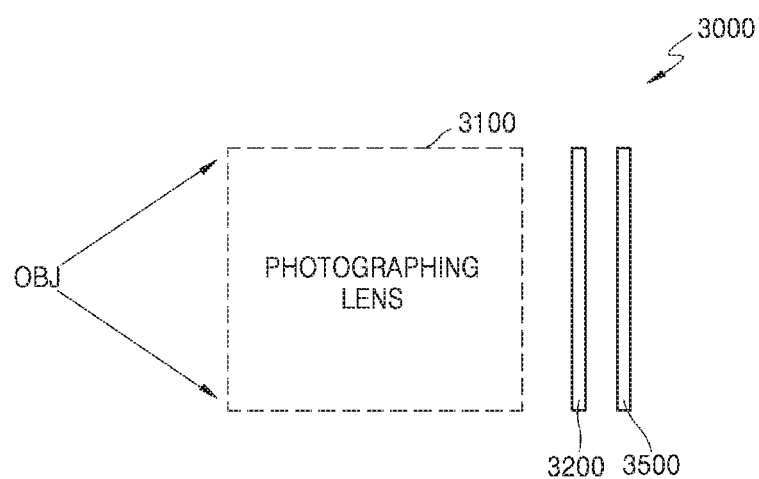
FIG. 20 shows a optical arrangement of a photographing apparatus according to an example embodiment.

FIG. 20 shows a schematic optical arrangement of a photographing apparatus 3000 according to an example embodiment.

The photographing apparatus 3000 includes a photographing lens 3100 and an image sensor 3500 configured to convert an optical image of an object OBJ formed by the photographing lens 3100 into an electrical signal. A cover glass 3200 may be disposed between the photographing lens 3100 and the image sensor 3500, and an infrared cutoff filter may be coated on the cover glass 3200.

The image sensor 3500 is located on an image plane where an optical image of the subject OBJ is formed by the photographing lens 3100. The image sensor 3500 may include an array of charge coupled devices (CCDs), complementary metal oxide semiconductors (CMOSs), photodiodes, etc. for generating electrical signals by sensing light. The image sensor 3500 is not limited thereto.

The photographing lens 3100 may include at least one meta-lens. As described with reference to FIGS. 10 and 11, the photographing lens 3100 may have an arbitrary configuration including a meta-lens. As the meta-lens included in the photographing lens 3100, the meta-lenses 100 and 101 or a modification thereof may be employed. The meta-lens may have a performance capable of more effectively correcting aberration in a wide wavelength band of a visible light band, and thus, the performance of the photographing apparatus 3000 may be improved.

The meta-lens described above may realize a thin lens by using nanostructures and may realize the desired optical performance with respect to a wide wavelength bandwidth.

The meta-lens described above is capable of more easily controlling various aberrations, and thus, may be applied to a photographing lens, and the photographing lens may be employed in various optical apparatuses, such as an image sensor, a photographing device, etc.

While example embodiments have been described with reference to the figures, it will be understood by those of ordinary skill in the art that various changes in form and details may be made therein without departing from the spirit and scope as defined by the following claims.

What is claimed is:

1. A meta-lens comprising:
a first region comprising a plurality of first nanostructures that are two-dimensionally provided in a circumferential direction and a radial direction; and
a plurality of second regions surrounding the first region, each of the plurality of second regions comprising a plurality of second nanostructures that are two-dimensionally provided in the circumferential direction and the radial direction,
wherein a geometric arrangement of the plurality of second nanostructures in the plurality of second regions, is different from a geometric arrangement of the plurality of first nanostructures in the first region,
wherein each of the plurality of first nanostructures and the plurality of second nanostructures has a polygonal column shape, and the plurality of first nanostructures and the plurality of second nanostructures are arranged to have a rotational symmetry with respect to the radial direction at a predetermined angle with respect to a rotation axis, and
wherein each nanostructure of the plurality of first nanostructures or the plurality of second nanostructures has a polar coordinate (r, φ), and an interval between adjacent nanostructures of the plurality of first nanostructures or the plurality of second nanostructures is expressed as a function of a distance r in the radial direction and is independent of a rotation angle φ.

2. The meta-lens of claim 1, wherein the first region has a circular shape, and each of the plurality of second regions have a concentric ring-shape, and
wherein each nanostructure of the plurality of first nanostructures or the plurality of second nanostructures is rotated by the rotation angle φ corresponding to its polar coordinate to achieve the rotational symmetry.

3. The meta-lens of claim 1, wherein a number of the plurality of second regions, the geometric arrangement of the plurality of second nanostructures in the plurality of second regions, and the geometric arrangement of the plurality of first nanostructures in the first region are set such that the meta-lens has a negative Abbe number.

4. The meta-lens of claim 1, wherein the polygonal column shape corresponds to a rectangular column shape.

5. The meta-lens of claim 1, wherein a radius of the first region is greater than a radial width of each of the plurality of second regions, which decreases in a direction away from the first region.

6. The meta-lens of claim 1, wherein the plurality of first nanostructures are arranged to have a rotational symmetry at a first predetermined angle with respect to a first rotation axis within the first region and the plurality of second nanostructures are arranged to have a rotational symmetry at a second predetermined angle with respect to a second rotation axis within the plurality of second regions, respectively.

7. The meta-lens of claim 6, wherein polar coordinates of locations of two nanostructures adjacent to each other in the radial direction of the plurality of first nanostructures and the plurality of second nanostructures are $(r_1, \varphi_1)$ and $(r_2, \varphi_1)$,
wherein a radial width (WR) of each of the two adjacent nanostructures satisfies:

$$WR \leq (3|r_1 - r_2|)/4, \text{ and}$$

wherein the radial width (WR) of a nanostructure is a width, in the radial direction, from an edge to another edge of the nanostructure.

8. The meta-lens of claim 6, wherein polar coordinates of locations of two nanostructures adjacent to each other in the circumferential direction of the plurality of first nanostructures and the plurality of second nanostructures are $(r_1, \varphi_1)$ and $(r_1, \varphi_2)$,
wherein a circumferential width (WC) of each of the two adjacent nanostructures satisfies:

$$WC \leq (3r_1|\varphi_1 - \varphi_2|)/4, \text{ and}$$

wherein the circumferential width (WC) of a nanostructure is a width, in the circumferential direction, from an edge to another edge of the nanostructure.

9. The meta-lens of claim 1, wherein a number of the plurality of second regions are set such that the meta-lens has refractive power with respect to incident light of a predetermined wavelength band.

10. The meta-lens of claim 9, wherein the predetermined wavelength band comprises a visible light wavelength band.

11. The meta-lens of claim 9, wherein a first interval between adjacent nanostructures of the plurality of first nanostructures and a second interval between adjacent nanostructures of the plurality of second nanostructures, respectively, are less than λ, where λ is a wavelength of the incident light within the predetermined wavelength band.

12. The meta-lens of claim 9, wherein locations of two adjacent nanostructures of the plurality of first nanostructures and the plurality of second nanostructures respectively are represented by polar coordinates $(r_1, \varphi_1)$ and $(r_2, \varphi_2)$, and wherein $|r_1-r_2|$ and $|\varphi_1-\varphi_2|$ between the two adjacent nanostructures are different from each other in at least two locations of the first region and the plurality of second regions.

13. The meta-lens of claim 9, wherein a height (H) of each of the plurality of first nanostructures and the plurality of second nanostructures satisfies:

$$\lambda/2 \le H \le 6\lambda,$$

where $\lambda$ is a wavelength within the predetermined wavelength band.

14. The meta-lens of claim 9, wherein a height (H) of the plurality of first nanostructures and the plurality of second nanostructures satisfies:

$$\lambda/2 \le H \le 3\lambda,$$

where $\lambda$ is a wavelength within the predetermined wavelength band.

15. The meta-lens of claim 9, wherein a height of the plurality of first nanostructures and a height of the plurality of second nanostructures are different from each other in at least two locations of the first region and the plurality of second regions.

16. The meta-lens of claim 9, wherein heights of at least two nanostructures included in any one location of the first region and the plurality of second regions are different from each other.

17. The meta-lens of claim 16, wherein a difference in heights between the at least two nanostructures is equal to or less than $2\lambda$ with respect to a wavelength of the incident light $\lambda$ within the predetermined wavelength band.

18. The meta-lens of claim 9, wherein the plurality of first nanostructures and the plurality of second nanostructures are provided in a multilayer structure, and wherein the plurality of first nanostructures and the plurality of second nanostructures respectively comprise a plurality of lower nanostructures included in a first layer and a plurality of upper nanostructures included in a second layer that is spaced apart from the first layer in a height direction.

19. The meta-lens of claim 18, wherein the plurality of lower nanostructures and the plurality of upper nanostructures are misaligned with each other in the height direction.

20. The meta-lens of claim 18, wherein a distance in the height direction between a lower nanostructure and an upper nanostructure, which are adjacent to each other, among the plurality of lower nanostructures and the plurality of upper nanostructures, is greater than $\lambda/2$ with respect to a wavelength of incident light $\lambda$ within the predetermined wavelength band.

21. The meta-lens of claim 18, wherein a shape distribution of the plurality of lower nanostructures and a shape distribution of the plurality of upper nanostructures are determined such that distributions of performance indexes of the meta-lens based on locations are different from each other.

22. The meta-lens of claim 18, wherein a shape distribution of the plurality of lower nanostructures and a shape distribution of the plurality of upper nanostructures are determined such that non-uniformity in focusing performance by the meta-lens based on locations are compensated for by each other.

23. The meta-lens of claim 9, further comprising:
a substrate,
wherein the plurality of first nanostructures and the plurality of second nanostructures respectively comprise a material having a refractive index greater than that of the substrate.

24. The meta-lens of claim 23, wherein a difference between a refractive index of the substrate and a refractive index of the plurality of first nanostructures and the plurality of second nanostructures, respectively, is equal to or greater than 0.5.

25. The meta-lens of claim 23, further comprising a protection layer covering the substrate and the plurality of first nanostructures and the plurality of second nanostructures.

26. The meta-lens of claim 25, wherein a difference between a refractive index of the protection layer and a refractive index of the plurality of first nanostructures and the plurality of second nanostructures, respectively, is equal to or greater than 0.5.

27. A photographing lens comprising:
a meta-lens comprising:
a first region comprising a plurality of first nanostructures that are two-dimensionally provided in a circumferential direction and a radial direction; and
a plurality of second regions surrounding the first region, each of the plurality of second regions comprising a plurality of second nanostructures that are two-dimensionally provided in the circumferential direction and the radial direction, wherein a geometric arrangement of the plurality of second nanostructures in the plurality of second regions, is different from a geometric arrangement of the plurality of first nanostructures in the first region; and
at least one refractive lens comprising a light incident surface and a light exit surface, at least one of the light incident surface and the light exit surface being a curved surface,
wherein each of the plurality of first nanostructures and the plurality of second nanostructures has a polygonal column shape, and the plurality of first nanostructures and the plurality of second nanostructures are arranged to have a rotational symmetry with respect to the radial direction at a predetermined angle with respect to a rotation axis, and
wherein each nanostructure of the plurality of first nanostructures or the plurality of second nanostructures has a polar coordinate (r, $\varphi$), and an interval between adjacent nanostructures of the plurality of first nanostructures or the plurality of second nanostructures is expressed as a function of a distance r in the radial direction and is independent of a rotation angle $\varphi$.

28. The photographing lens of claim 27, wherein a number of the plurality of second regions are set such that the meta-lens has an Abbe number configured to compensate for chromatic aberration caused by the at least one refractive lens.

29. The photographing lens of claim 28, wherein the number of the plurality of second regions are set such that the meta-lens has a negative Abbe number.

30. The photographing lens of claim 28, wherein a focal length $f_m$ of the meta-lens and a focal length $f_1$ of the at least one refractive lens satisfy:

$$|f_m| > |f_1|.$$

31. A photographing apparatus comprising:
a photographing lens comprising:
  a meta-lens comprising:
    a first region comprising a plurality of first nanostructures that are two-dimensionally provided in a circumferential direction and a radial direction; and
    a plurality of second regions surrounding the first region, each of the plurality of second regions comprising a plurality of second nanostructures that are two-dimensionally provided in the circumferential direction and the radial direction, wherein a geometric arrangement of the plurality of second nanostructures in the plurality of second regions, is different from a geometric arrangement of the plurality of first nanostructures in the first region; and
  at least one refractive lens comprising a light incident surface and a light exit surface, at least one of the light incident surface and the light exit surface being a curved surface; and
an image sensor configured to convert an optical image formed by the photographing lens into an electrical signal,
wherein the plurality of first nanostructures and the plurality of second nanostructures are arranged to have a rotational symmetry with respect to the radial direction at a predetermined angle with respect to a rotation axis, and
wherein each of the plurality of first nanostructures and the plurality of second nanostructures has a polygonal column shape, and each nanostructure of the plurality of first nanostructures or the plurality of second nanostructures has a polar coordinate $(r, \varphi)$, and the shape or an interval between adjacent nanostructures of the plurality of first nanostructures or the plurality of second nanostructures is expressed as a function of a distance r in the radial direction and is independent of a rotation angle $\varphi$.

* * * * *